US012006126B2

(12) United States Patent
Davidowitz et al.

(10) Patent No.: US 12,006,126 B2
(45) Date of Patent: Jun. 11, 2024

(54) TECHNIQUES FOR TRACKING PHYSICAL PARAMETERS SUCH AS TEMPERATURE OF TRANSPORTED BIOLOGICAL MATERIALS

(71) Applicant: BioTillion, LLC, Skillman, NJ (US)

(72) Inventors: Hananel Davidowitz, Princeton, NJ (US); Theodore N. Altman, East Windsor, NJ (US); Ke Wang, Flemington, NJ (US); Zhengyan Zhai, Doylestown, PA (US); Jeremy Basch, Middlesex, NJ (US); Ron Or, Moshav Bney Atarot (IL)

(73) Assignee: Bio Tillion, LLC, Skillman, NJ (US)

( * ) Notice: Subject to any disclaimer, the term of this patent is extended or adjusted under 35 U.S.C. 154(b) by 777 days.

(21) Appl. No.: 17/011,518

(22) Filed: Sep. 3, 2020

(65) Prior Publication Data

US 2021/0061541 A1 Mar. 4, 2021

Related U.S. Application Data

(60) Provisional application No. 62/895,106, filed on Sep. 3, 2019.

(51) Int. Cl.
*B65D 81/38* (2006.01)
*A61J 1/14* (2023.01)

(52) U.S. Cl.
CPC ........ *B65D 81/3825* (2013.01); *A61J 1/1412* (2013.01); *A61J 2200/44* (2013.01); (Continued)

(58) Field of Classification Search
CPC ... B65D 81/3825; A61J 1/1412; A61J 1/1425; A61J 2200/44; A61J 2200/50; A61J 2200/70; A61J 2200/72; A61J 2205/60
See application file for complete search history.

(56) References Cited

U.S. PATENT DOCUMENTS 2,975,496 A 3/1961 McGraw
3,896,958 A 7/1975 Robbins et al.
(Continued)

FOREIGN PATENT DOCUMENTS

DE 20121738 U1 10/2003
DE 202010014903 U1 * 2/2011 .......... G01D 11/245
(Continued)

OTHER PUBLICATIONS

Lindsay, J.D., et al. "Cascading RFID Tags," IP.com Prior Art Database, Dec. 23, 2003, Retrieved from the Internet: <URL: www.jefflindsay.com/rfid3.shtml> [retrieved on Nov. 30, 2020] (10 pages).

*Primary Examiner* — Emmanuel E Duke
(74) *Attorney, Agent, or Firm* — Mendelsohn Dunleavy, P.C.; Steve Mendelsohn

(57) ABSTRACT

A technique for tracking, for example, the temperature of one or more sample vials containing biological material stored in a low-temperature shipping vessel. Each sample vial has vial electronics that senses temperature and transmits temperature data to the reader head of a reader device, which has a controller that is not at the low temperature. In some implementations, the shipping vessel has a cap with a recess that houses the controller and a hollow plug that houses a cable that connects the controller to the reader head that is located in the vessel's cold interior sufficiently close to the sample vial to enable interaction with the vial electronics. In some implementations, the reader head transmits electrical power to the vial electronics. By tracking the temperature of individual sample vials rather than the temperature of the vessel interior, more-relevant temperature data is available.

32 Claims, 7 Drawing Sheets

(52) U.S. Cl.
CPC ........ *A61J 2200/50* (2013.01); *A61J 2200/72* (2013.01); *A61J 2205/60* (2013.01)

(56) References Cited

U.S. PATENT DOCUMENTS

| | | | | |
|---|---|---|---|---|
| 4,639,611 | A * | 1/1987 | Sticher ..................... | G01K 7/24 323/365 |
| 5,287,414 | A | 2/1994 | Foster | |
| 5,533,970 | A | 7/1996 | Berger et al. | |
| 5,565,858 | A | 10/1996 | Guthrie | |
| 5,721,531 | A | 2/1998 | Garver et al. | |
| 5,777,303 | A | 7/1998 | Berney | |
| 5,906,101 | A | 5/1999 | Rajotte et al. | |
| 6,084,515 | A | 7/2000 | Maitin et al. | |
| 6,405,102 | B1 | 6/2002 | Swartz et al. | |
| 6,549,135 | B2 | 4/2003 | Singh et al. | |
| 6,652,812 | B1 | 11/2003 | Vartiainen et al. | |
| 6,658,218 | B2 | 12/2003 | Krolczyk et al. | |
| 6,791,432 | B2 | 9/2004 | Smith et al. | |
| 6,829,520 | B1 | 12/2004 | Green | |
| 6,831,552 | B2 | 12/2004 | Lin | |
| 6,918,698 | B2 | 7/2005 | Nordmeyer et al. | |
| 6,956,538 | B2 | 10/2005 | Moore | |
| 7,070,053 | B1 | 7/2006 | Abrams et al. | |
| 7,079,044 | B1 | 7/2006 | Stanfield et al. | |
| 7,091,864 | B2 | 8/2006 | Veitch et al. | |
| 7,327,266 | B2 | 2/2008 | Watanabe et al. | |
| 7,646,354 | B2 | 1/2010 | Martin et al. | |
| 7,661,591 | B2 | 2/2010 | Dearing et al. | |
| 7,838,844 | B2 | 11/2010 | Wagner et al. | |
| 7,930,066 | B2 | 4/2011 | Eliuk et al. | |
| 8,035,485 | B2 | 10/2011 | Fritchie | |
| 8,049,626 | B2 | 11/2011 | Sakama et al. | |
| 8,115,599 | B2 | 2/2012 | Harazin et al. | |
| 8,314,740 | B2 | 11/2012 | Blumberg, Jr. | |
| 8,346,382 | B2 | 1/2013 | Davidowitz et al. | |
| 8,377,030 | B2 | 2/2013 | Hyde et al. | |
| 8,378,827 | B2 | 2/2013 | Davidowitz et al. | |
| 8,438,951 | B1 | 5/2013 | McCabe et al. | |
| 8,502,645 | B2 | 8/2013 | Thomas et al. | |
| 8,550,273 | B2 | 10/2013 | Levin et al. | |
| 8,852,536 | B2 | 10/2014 | Davidowitz et al. | |
| 8,872,627 | B2 | 10/2014 | Davidowitz | |
| 9,431,692 | B2 | 8/2016 | Davidowitz et al. | |
| 9,764,325 | B2 | 9/2017 | Davidowitz | |
| 9,910,054 | B2 | 3/2018 | Johns | |
| 10,328,431 | B2 | 6/2019 | Davidowitz | |
| 10,401,082 | B2 | 9/2019 | Coradetti et al. | |
| 11,148,143 | B2 | 10/2021 | Davidowitz et al. | |
| 2002/0023441 | A1 | 2/2002 | Bara et al. | |
| 2003/0095253 | A1 | 5/2003 | Chow | |
| 2004/0008123 | A1* | 1/2004 | Carrender ........ | G06K 19/07749 340/8.1 |
| 2004/0152202 | A1* | 8/2004 | Van der Maas ...... | B01L 3/5453 422/547 |
| 2004/0239274 | A1* | 12/2004 | Karwath ................. | H02P 6/085 318/400.14 |
| 2005/0060062 | A1 | 3/2005 | Walker et al. | |
| 2005/0069861 | A1 | 3/2005 | Zimmermann et al. | |
| 2005/0205673 | A1 | 9/2005 | Morris et al. | |
| 2006/0102645 | A1 | 5/2006 | Walker et al. | |
| 2006/0199196 | A1 | 9/2006 | O'Banion et al. | |
| 2006/0215495 | A1 | 9/2006 | Soled et al. | |
| 2006/0239331 | A1* | 10/2006 | Schwegman .......... | G01K 1/024 374/E1.004 |
| 2006/0245865 | A1 | 11/2006 | Babson | |
| 2007/0109130 | A1 | 5/2007 | Edenfield | |
| 2007/0171075 | A1 | 7/2007 | Ryu | |
| 2007/0205126 | A1 | 9/2007 | Elsener et al. | |
| 2007/0296599 | A1 | 12/2007 | Wang et al. | |
| 2008/0106388 | A1 | 5/2008 | Knight | |
| 2008/0131629 | A1 | 6/2008 | Chisholm et al. | |
| 2008/0149584 | A1 | 6/2008 | Martinelli | |
| 2008/0164210 | A1 | 7/2008 | DeMarco | |
| 2008/0186147 | A1 | 8/2008 | Carmeli | |
| 2008/0188980 | A1 | 8/2008 | Home | |
| 2008/0231157 | A1 | 9/2008 | Lowe | |
| 2009/0234839 | A1 | 9/2009 | Angell et al. | |
| 2009/0242446 | A1 | 10/2009 | Abbot et al. | |
| 2009/0306620 | A1 | 12/2009 | Thilly et al. | |
| 2010/0102967 | A1 | 4/2010 | Lee et al. | |
| 2010/0302040 | A1 | 12/2010 | Davidowitz et al. | |
| 2010/0328037 | A1 | 12/2010 | Thomas et al. | |
| 2011/0100862 | A1 | 5/2011 | Turkington et al. | |
| 2011/0127273 | A1 | 6/2011 | Deane et al. | |
| 2011/0199187 | A1 | 8/2011 | Davidowitz | |
| 2012/0125014 | A1 | 5/2012 | Ilercil et al. | |
| 2013/0119071 | A1 | 5/2013 | Hyde et al. | |
| 2013/0119072 | A1 | 5/2013 | Hyde et al. | |
| 2014/0230472 | A1 | 8/2014 | Coradetti et al. | |
| 2014/0352456 | A1 | 12/2014 | Davidowitz | |
| 2016/0166471 | A1* | 6/2016 | Tobescu ............. | G06K 19/0717 29/428 |
| 2017/0030613 | A1 | 2/2017 | Ilercil | |
| 2017/0205138 | A1 | 7/2017 | Hwang et al. | |
| 2020/0088464 | A1 | 3/2020 | Coradetti et al. | |
| 2022/0072533 | A1 | 3/2022 | Davidowitz et al. | |

FOREIGN PATENT DOCUMENTS

| | | | | |
|---|---|---|---|---|
| EP | 0190452 | A1 * | 12/1985 | |
| WO | WO-0226385 | A1 * | 4/2002 | ............ B01L 3/5453 |
| WO | 2004102330 | A2 | 11/2004 | |
| WO | 2012139090 | A1 | 10/2012 | |

* cited by examiner

TECHNIQUES FOR TRACKING PHYSICAL PARAMETERS SUCH AS TEMPERATURE OF TRANSPORTED BIOLOGICAL MATERIALS

CROSS-REFERENCE TO RELATED APPLICATIONS

This application claims the benefit of the filing date of U.S. provisional application No. 62/895,106, filed on Sep. 3, 2019, the teachings of which are incorporated herein by reference in their entirety.

STATEMENT REGARDING FEDERALLY SPONSORED RESEARCH OR DEVELOPMENT

The Government of the United States of America may have rights in this invention pursuant to National Institutes of Health (NIH) Small Business Innovation Research (SBIR) Grant No. OD020162.

BACKGROUND

Field of the Disclosure

The present disclosure relates to the storage and transport of biological materials and, more specifically but not exclusively, to systems for tracking the temperature of biological materials transported in low-temperature shipping vessels such as dry shippers, dewars, and foam boxes.

Description of the Related Art

This section introduces aspects that may help facilitate a better understanding of the disclosure. Accordingly, the statements of this section are to be read in this light and are not to be understood as admissions about what is prior art or what is not prior art.

A low-temperature shipping vessel is typically used to ship sample vials containing biological material such as vaccines, pharmaceuticals, cell-based therapy treatments, antibodies, biologics, RNA, viable cells, etc.

FIG. 1 is a cross-sectional side view of a conventional type of shipping vessel referred to as a dry shipper that may be used to transport biological material at close to liquid-nitrogen temperatures (−196° C.). The dry shipper 100 of FIG. 1 is a dewar-type container having vacuum insulation 101 and a suitable material 104 that adsorbs and/or absorbs liquid nitrogen. Sample vials 109 are placed in a sample space 105 within the dry shipper 100. The dry shipper 100 is closed by a plug 103, typically in the form of an insulating foam, connected to a cap 102 that protects the foam and allows removal of the plug 103. If the temperature inside the dry shipper 100 needs to be tracked, a temperature logger 106 can be strapped to the outside of the dry shipper 100 and connected via a cable 107 to a temperature probe 108 located inside the dry shipper 100 that measures the temperature in the sample space 105.

FIGS. 2A-2C are cross-sectional side views of a conventional sample vial 109 of FIG. 1. In particular, FIG. 2A shows the unassembled vial 109, FIG. 2B shows the assembled vial 109, and FIG. 2C shows the vial 109 with a portion 204 of the cap 203 removed.

As shown in FIG. 2A, the vial 109 includes an (e.g., glass or plastic) vial container 200, an (e.g., rubber) vial stopper 201, and an (e.g., plastic or metal) vial cap 203 with a cylindrical, crimpable (e.g., metal) skirt 202 molded into the cap 203. As shown in FIG. 2B, the vial 109 is assembled by inserting the stopper 201 into the opening at the top of the container 200, placing the cap 203 on top of the stopper 201 with the skirt 202 surrounding the stopper 201 and the top of the container 200, and crimping the skirt 202 around the container lip 206 to secure the cap 203 in place and retain the stopper 201 within the container 200.

As shown in FIG. 2C, the cap 203 is designed to break in a controlled way such that a disposable portion 204 of the cap 203 may be removed to provide access to the stopper 201, e.g., to enable a needle (not shown) to be inserted through the stopper 201 and into the interior of the container 200 for removal of some of the injectable biological material (not shown) stored in the vial 109. Note that a ring-shaped portion 205 of the cap 203 stays in place on top of the stopper 201 with the crimped skirt 202 continuing to retain the stopper 201 within the container 200.

SUMMARY

Knowing the history of a sample, in particular, for many injectables, its temperature history, helps to ensure that the biological material is still injectable or otherwise usable in the intended way.

Consider the following example of a conventional scenario. A particular vaccine stored in sample vials needs to remain at dry ice temperatures until it is injected into a patient. The vials are shipped to a different country in a foam box containing dry ice along with a conventional temperature logger, such as logger 106 of FIG. 1, that records the temperature within the foam box. At the destination country, customs agents open the foam box on a hot tarmac to inspect the shipment, sample vials are removed from the box, manifests are cross checked, etc. The vials warm up and the vaccine becomes ineffective. The temperature logger buried in the dry ice within the box does not report elevated temperatures because it was not removed from the box. Eventually, the vials are repacked and shipped to a remote clinic. The medical staff unwittingly injects the vaccine even though it is no longer effective.

Such problems in the prior art are addressed in accordance with the principles of the present disclosure by incorporating into the design of a sample, vial electronics configured to measure and track temperature of the vial over time.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Figure 1:
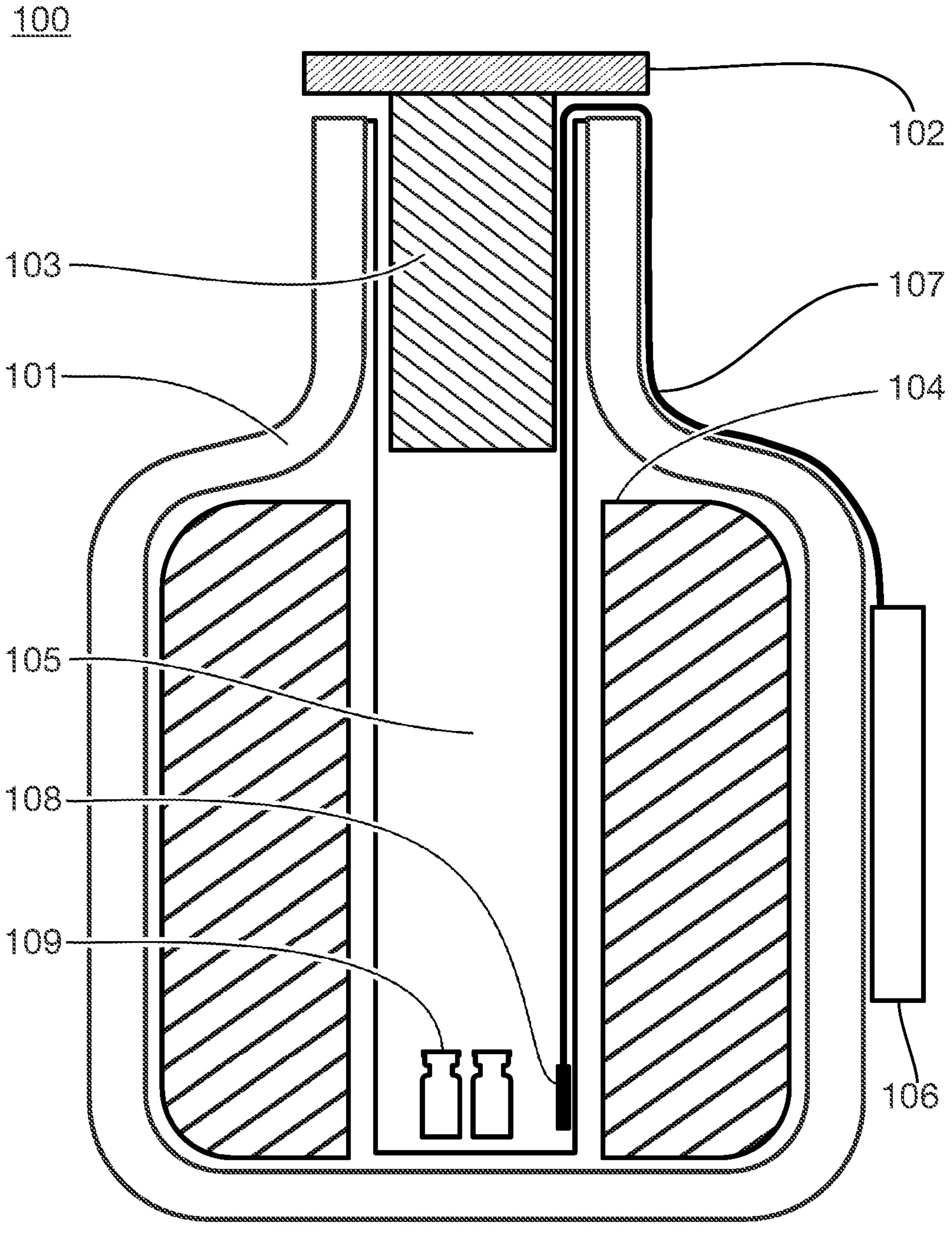
Fig. 1 (PRIOR ART)
FIG. 1 is a cross-sectional side view of a conventional dry shipper that is used to transport biological material at low temperatures.

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

FIGS. 3A-3F are cross-sectional side views of respective sample vials 310-360 for storing biological material, according to certain embodiments of the disclosure. Similar to the conventional sample vials 109 of FIGS. 1-2, each of the vials 310-360 has a vial container 300 having a container lip 306, a vial stopper 301, and a vial cap 303 having a crimpable skirt 302 that can be crimped to secure the cap 303 on top of the stopper 301 and retain the stopper 301 inside the container 300.

The container 300 is made of a suitable material such as a suitable plastic, glass, or metal. The stopper 301 is made of a suitable material such as a suitable elastomeric rubber or plastic. The cap 303 is made of a suitable materials such as suitable plastic or metal. The skirt 302 is made of a suitable material such as a suitable metal. Although not shown in the figures, similar to the conventional vials 109 of FIGS. 1-2, a disposable portion of the cap 303 of each of the vials 310-360 can be removed leaving the skirt 302 and a ring-shaped portion of the cap 303 in place to provide access to the stopper 301 while retaining the stopper 301 within the container 300.

Figure 3A:
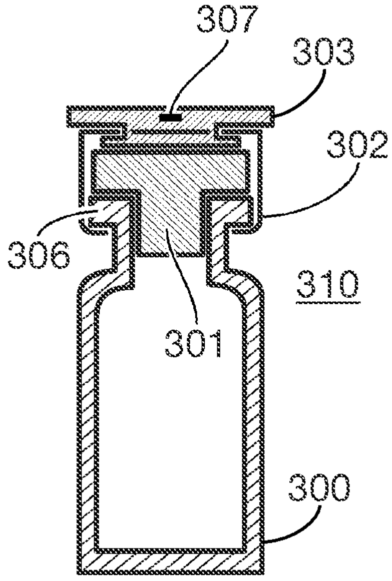
Figure 3B:
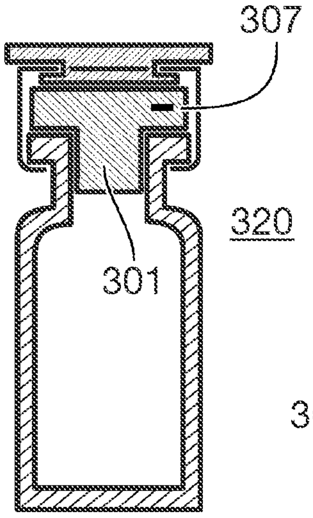
Figure 3C:
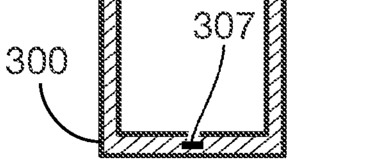
Figure 3D:
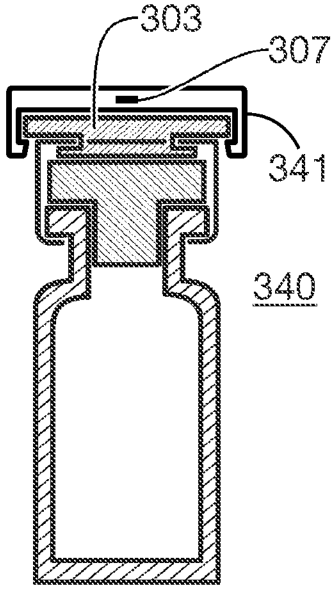
Figure 3E:
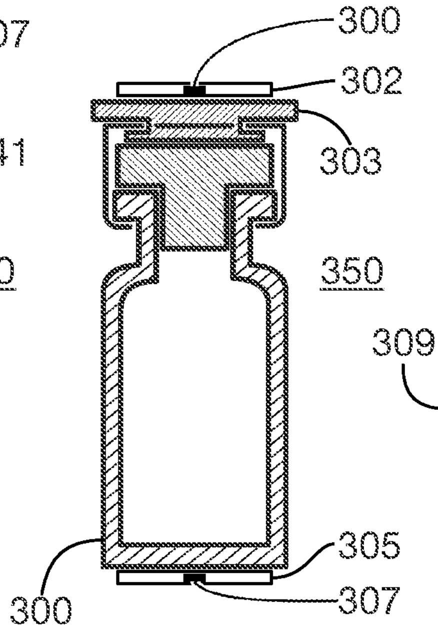
Figure 3F:
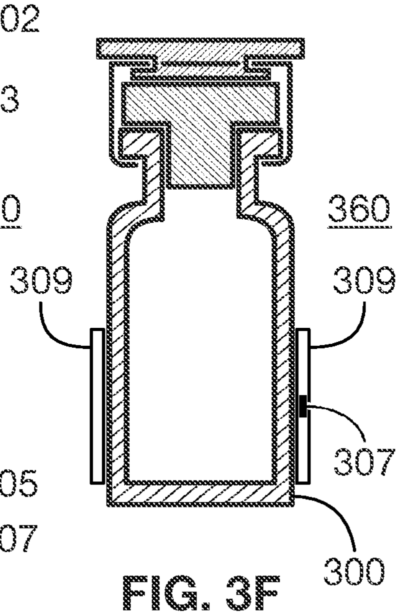

As shown in FIGS. 3A-3F, each of the vials 310-360 is further configured with a set of electronics 307 that are designed, for example, to log the temperature of the vial over time. In particular:

- In the vial 310 of FIG. 3A, the electronics 307 are embedded within the cap 303;
- In the vial 320 of FIG. 3B, the electronics 307 are embedded within the stopper 301, preferably at a location that will not interfere with the injection of a needle through the stopper 301;
- In the vial 330 of FIG. 3C, the electronics 307 are embedded within the container 300 which may or may not have a double-wall construction;
- In the vial 340 of FIG. 3D, the electronics 307 are embedded within a clip-on structure 341 that is mounted onto the cap 303. In alternative implementations, analogous clip-ons can attach to the vials using indentations in the vial containers and/or caps in other suitable ways;
- In the vial 350 of FIG. 3E, the electronics 307 are embedded within a label 308 that may be secured to the top of the cap 303 or to the bottom of the container 300 using a suitable adhesive; and
- In the vial 360 of FIG. 3F, the electronics 307 are embedded within a label 309 that may be secured to the side of the container 300 using a suitable adhesive and/or by wrapping the label around the container 300.

Those skilled in the art will understand that there are other ways and/or other locations for configuring sample vials with such vial electronics 307. Note that the vial electronics 307 in FIGS. 3A-3F are not necessarily drawn to scale.

In certain embodiments, the vial electronics 307 can record all or part of the history of one or more physical parameters in, on, or at the sample vial, such as (without limitation) temperature, radiation, g-forces, shock, orientation, pressure, location (e.g., GPS information), insertion time, removal time, and/or light intensity. Different parameters might be tracked for different sample vials. All stored measurements can be timestamped as needed. In certain embodiments, information can be stored at preset intervals and/or in alarm situations, e.g., when a physical parameter has been measured outside of preset limits.

The vial electronics 307 can be added during what is typically an injection-molding process used to fabricate the corresponding part of the sample vial. But the incorporation of the electronics 307 is not limited to an injection-molding process—the electronics 307 can be incorporated during any suitable manufacturing process (e.g., casting, machining, etc.) that is used in the production of the corresponding vial part.

Any of the above techniques allows the end-user to verify the history of each individual sample vial without modifying the vial's functionality or existing use cases and procedures.

Figure 4A:
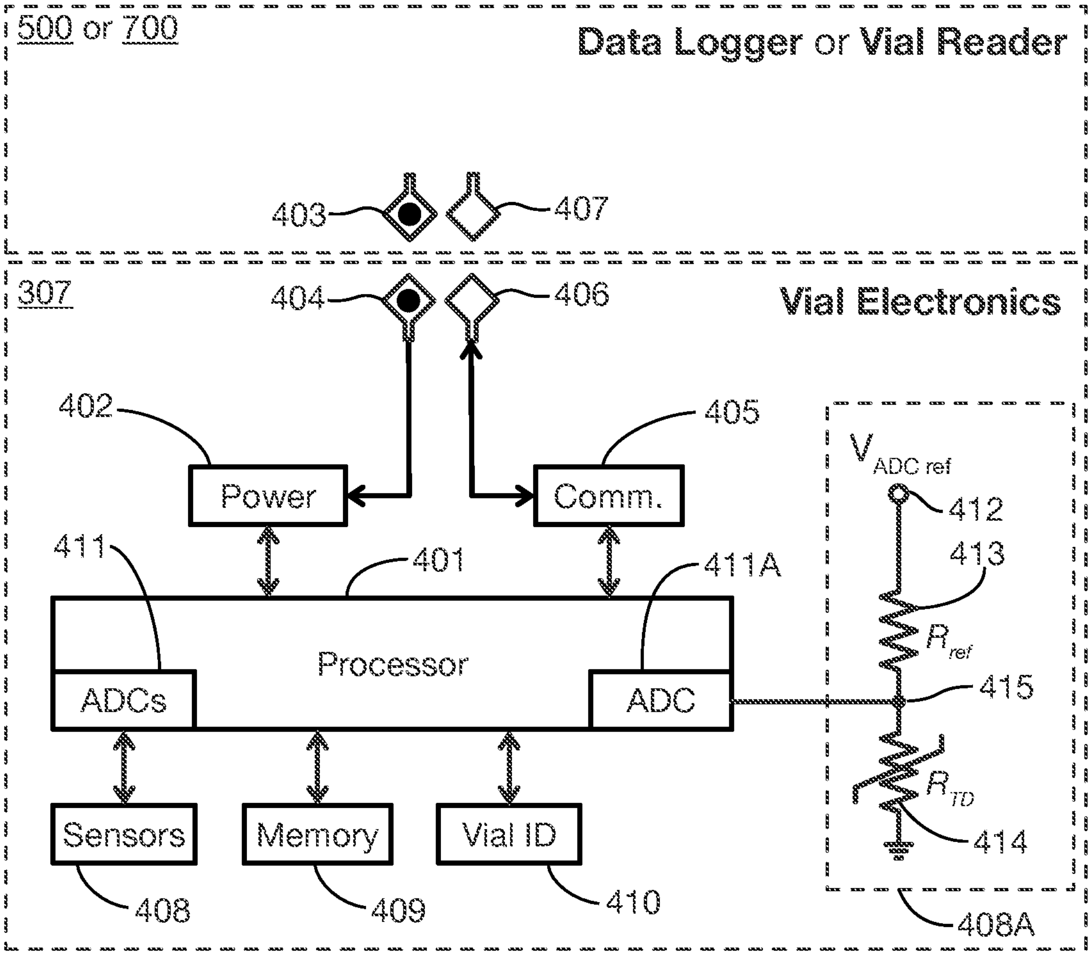
FIG. 4A is a block diagram of the vial electronics of FIGS. 3A-3F, according to one possible embodiment.
Figure 5:
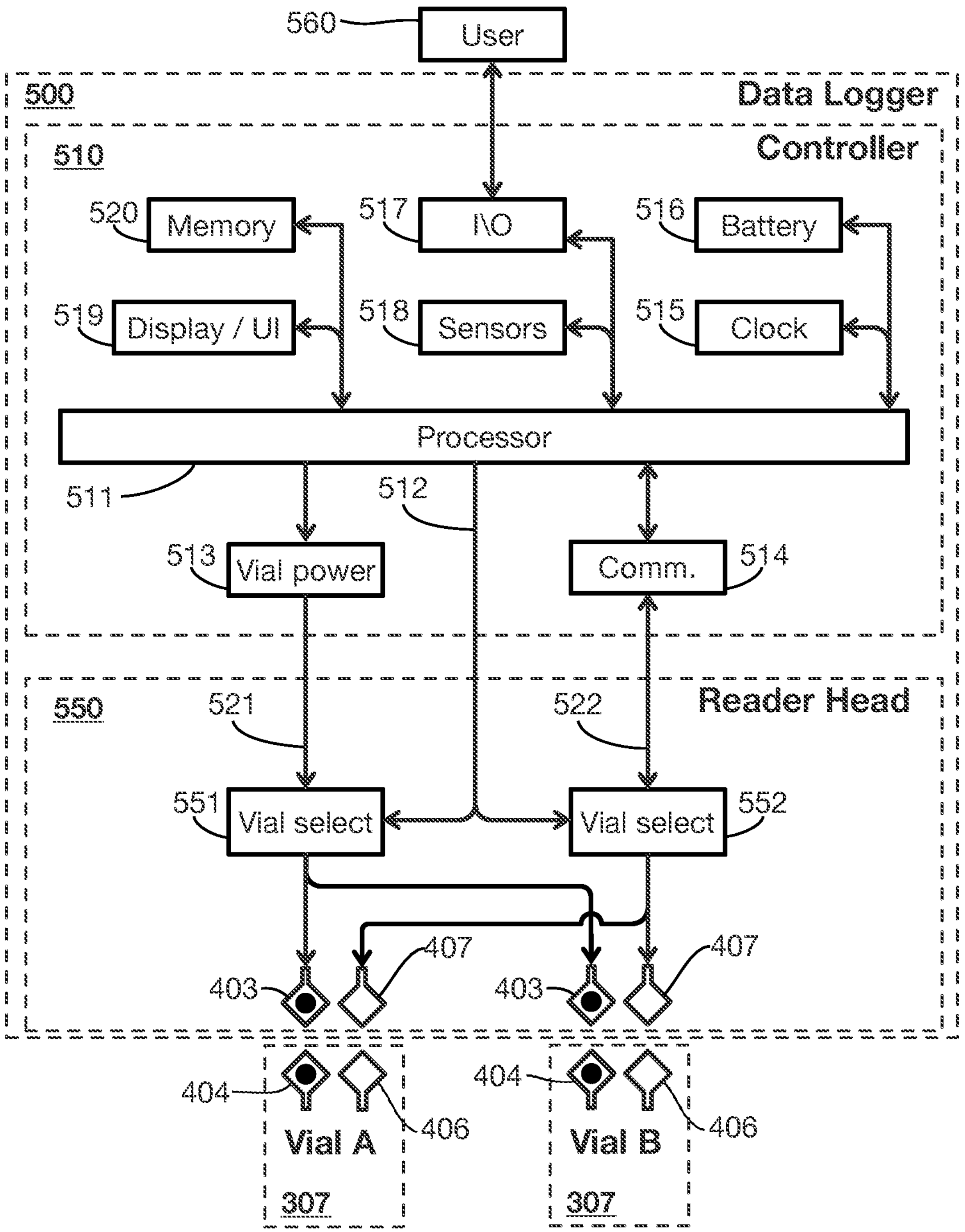
FIG. 5 is a block diagram of a data logger according to one possible embodiment.
Figure 7A:
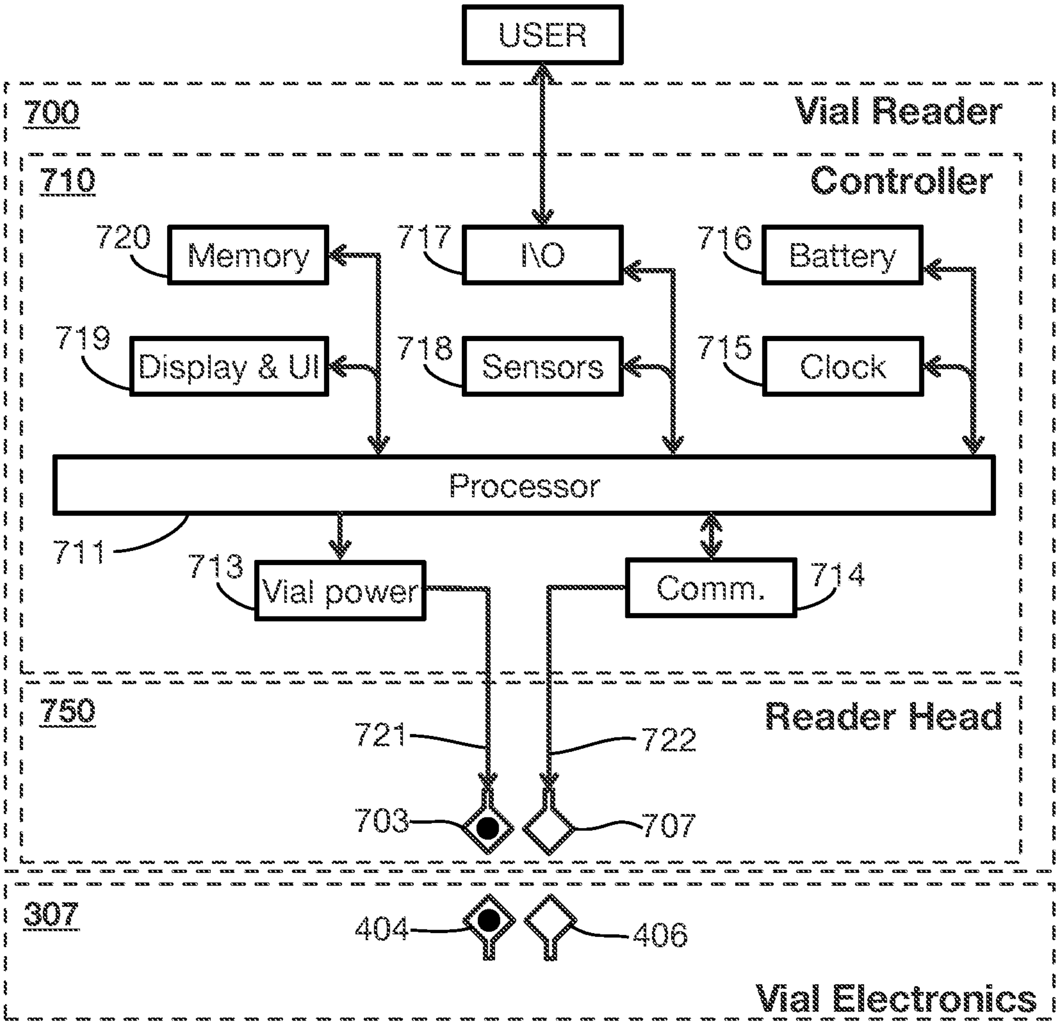
FIG. 7A is a block diagram of a vial reader, according to one possible embodiment.

FIG. 4A is a block diagram of the vial electronics 307 of FIGS. 3A-3F configured to be read by a data logger 500 of FIG. 5 or a vial reader 700 of FIG. 7A, according to one possible embodiment. As shown in FIG. 4A, the vial electronics 307 includes a processor 401 (e.g., a suitable microprocessor) electronically connected to a power module 402, a communication module 405, one or more sensors 408, a memory 409, and a vial ID register 410. The power module 402 is also electronically connected to a power antenna 404 that is electromagnetically coupled in a wireless manner to a corresponding power antenna 403 of the data logger 500/vial reader 700. Similarly, the communication module 405 is also electronically connected to a communication antenna 405 that is electromagnetically coupled in a wireless manner to a corresponding communication antenna 407 of the data logger 500/vial reader 700.

In operation, the vial electronics 307 receives operating power from the data logger 500/vial reader 700 via the power antennas 403 and 404 and the power module 402. The one or more sensors 408 sense one or more physical parameters and transmit raw sensor data to the processor 401 which may process the raw sensor data, store the raw and/or processed sensor data (possibly along with other data) in the memory 409, and/or transmit the (possibly timestamped) raw and/or processed sensor data to the data logger 500/vial reader 700 via the communication module 405 and the communication antennas 406 and 407. Note that, in some embodiments, control/data signals (e.g., timestamp, geospatial information, etc.) can also be transmitted from the data logger 500/vial reader 700 to the processor 401 via the communication antennas 406 and 407 and the communication module 405.

The vial ID register 410 stores a unique vial ID number that uniquely identifies the instance of the vial electronics 307, thereby enabling the sample vial to be identified and tracked by an external system.

The antennas 403, 404, 406, and 407 can be in the form of near-field or far-field design depending on the specifics of the embodiment and the size of the sample-holding shipping vessel (e.g., a dry shipper, dewar, or foam box). In some implementations, the reader and power antennae 403 and 407 can be external to the shipping vessel and sufficiently powered to interact with the vial electronics 307 within the vessel. In the case of an RFID-based communication channel, sample vials can be addressed individually using standard RFID protocols.

Since each sample vial is preferably configured with its own set of vial electronics 307, the history of the one or more physical parameters (e.g., temperature) for each individual vial can be tracked over time. If a vial is removed from the shipping vessel, the vial electronics 307 enables, for example, the temperature of the vial to be tracked, if it is properly powered, thereby providing accurate information about the temperature history of the vial contents even when the interior of the vessel remains at the desired cold temperature. Even if the vial is removed and not powered, the fact that the vial was not in the intended environment for a given amount of time is in itself important information.

The exact organization of how the functions of FIG. 4A are distributed amongst the components in the vial electronics 307 will be dependent on the details of how the circuitry is implemented. For example, the communication module 405 and vial ID register 410 might be part of an RFID tag that might also contain the vial memory 409. In some other embodiments, the processor 401 or the sensors 408 might contain sensor-data digitization circuitry (e.g., analog-to-digital converters (ADCs) 411).

The communication module 405 can be implemented using RFID chips that operate at appropriate frequencies, such as, but not limited to the HF or UHF bands. The unique ID of the sample vial could be contained in the RFID chip's TID (Tag Identifier) and possibly the EPC (Electronic Product Code) memories. Data from the memory 409 can be channeled through an RFID chip implemented with a data bus.

In certain cases, small amounts of data in the vial electronics 300 might suffice. This might occur when, for example, the end-user needs to know only if the temperature of the vial exceeded a preset value. In this case, it is possible to modify the EPC memory or the user memory of an RFID tag to contain the appropriate information without modifying the bits containing its unique ID.

In some embodiments, compression of data can be allow maintaining significant amounts of data in small amounts of memory. As an example, a Monza X-8K chip by Impinj, Inc., of Seattle, Washington, holds 8k bytes of memory.

Assume that a certain sample needs to be maintained below a certain temperature, e.g., the glass transition of water at −134° C. While a data logger 500 can record every temperature measurement, the vial electronics 307 can simply store the number of reads that were above and below the critical temperature. One bit per byte, e.g., the most significant bit, can be used to code the above or below state and 7 bits per byte can be used to code the number of read cycles at that temperature. An extreme example is a wildly fluctuating temperature over a 2-day shipment, and a temperature measurement once a minute (2,880 measurements). If the temperature crossed the threshold (back and forth) every single read (a very unlikely scenario), then the memory will contain bytes of the repeating form 0000 0001 (below the threshold for 1 cycle), 1000 0001 (above the threshold for 1 cycle). This would use less than 3k bytes of memory. At the other extreme, if no transitions occurred at all, all of the bytes would be of the form 0111 1111 (below the threshold for 128 reads). This would require only 23 bytes memory for the whole shipment. Of course, a larger number of temperature ranges can be used if needed, for example, 8 ranges encoded into 3 bits at the expense of the other data contained in each byte.

As shown in FIG. 4A, the processor 401 of the vial electronics 307 can have one or more analog-to-digital converters (ADCs) 411 that can directly measure analog sensor outputs. In other embodiments, the sensors can communicate digitally.

The number of components and measurement accuracy can be improved if the sensor information can be read in one single measurement and in such way such that it is independent of the vial electronics supply voltage. One embodiment of how this can be done is shown in FIG. 4A in the case of a temperature measurement by the temperature sensor 408A. The ratio of a temperature-independent resistor 413 having resistance $R_{ref}$ and a temperature-dependent resistor 414 having resistance $R_{TD}$ is measured by ADC 411A at point 415 yielding an ADC count of $C_{RTD}$. The temperature-dependent resistor 414 can be in the form of a platinum resistance that has very well documented temperature dependence. Since the two resisters are in series, the current through them is equal. Since the ADC reference voltage 412 is used as the voltage source, there is no need to measure the voltage on the reference resistor 413 since it is always the maximum ADC count number $C_{max}$. The value of the temperature-dependent resistor 414 can be shown to be: $R_{TD}=R_{ref}*(C_{RTD}/C_{max})$. This method achieves the following: (a) even if the temperature is rapidly fluctuating, an accurate measurement can be made because it is done in one measurement, (b) measurements are independent of supply voltages which can be slightly different between different instances of the vial electronics 307, and (c) measurements are independent of supply voltage within an instance of the vial electronics which can change over the course of a shipment as batteries are depleted.

The frequency of the power signal and the data communication channel can be the same or different, depending on the implementation. In addition, in some alternative embodiments, each of the vial electronics 307 and/or the data logger 500/vial reader 700 has a single antenna that functions as both a power antenna and a communication antenna with suitable electronics configured to separate and/or combine the incoming and outgoing signals as appropriate.

Blood-bags are often shipped in liquid form. In that case, batteries can power the electronics 307 without the need for an external power source. At much lower temperatures, where batteries do not operate, graphene super-capacitors or other suitable components might be incorporated in the vial electronics 307 to allow the electronics to be charged before shipment, thus eliminating the need to energize the vial electronics 307 using external sources, such as the data logger 500 or the vial reader 700.

FIG. 5 is a block diagram of a data logger 500 according to one possible embodiment. As shown in FIG. 5, the data logger 500 has a controller 510 and a reader head 550 configured to support operations with the vial electronics 307 of FIG. 4A for two different vials A and B either serially or in parallel. Anyone skilled in the art can modify this embodiment to any suitable number of vials. In other embodiments, data loggers can be designed to support operations of any other suitable number of instances of vials having vial electronics 307. As described further below in the context of FIGS. 6A and 6B, in certain implementations, the controller 510 resides outside of the cold interior sample space of a shipping vessel that holds the sample vials, while the reader head 550 resides inside that cold interior sample space in sufficiently close proximity to the different instances of the sample vials to enable data and/or power interaction between the reader head and the vial electronics 307 of the sample vials.

The controller 510 has a processor 511 (e.g., a microprocessor) that coordinates the storage and retrieval of data to and from one or more vial electronics 307. The processor 511 is electronically connected to the reader head 550 via select lines 512, a vial power module 513 (a power excitation circuit), a communication module 514 (a data communication circuit), a clock 515, a battery 516, an input/output (I/O) module 517, one or more sensors 518, a display and user interface (UI) module 519, and a memory 520. The I/O module 517 enables two-way communication with an external end-user system 560 (e.g., a computer) to update the data logger 500 (with the correct time, for example) and export data to the end-user system 560.

The controller 510 has a unique ID number, which can be maintained in the system memory 520, in the processor 511, in the I/O circuitry 517, or and in any other suitable place. The controller ID number allows the shipper and the vials to be associated with each other in the data. This can be beneficial for maintaining cold-chain-of-custody records and for maintenance purposes.

The reader head 550 has a vial-select switch 551 connected (i) to the processor 511 via one of the select lines 512, (ii) to the vial power module 513 via connection 521, and (iii) to two different power antennas 403 that are respectively electromagnetically coupled to the power antennas 404 of the vial electronics 307 of the two different sample vials A and B. Similarly, the reader head 550 also has a vial-select switch 552 connected (i) to the processor 511 via another of the select lines 512, (ii) to the vial communication module 514 via connection 522, and (iii) to two different communication antennas 407 that are respectively electromagnetically coupled to the communication antennas 406 of the vial electronics 307 of the two different sample vials A and B.

When writing or reading data, the processor 511 selects paths to a particular sample vial using the select lines 512 that control (i) the vial-select switch 551 for directing power to the particular vial and (ii) the vial-select switch 552 for selecting the data path from the particular vial. The processor 511 then activates the vial power module 513 and the vial communication module 514. Power is transmitted from the power module 513 to the vial electronics 307 via the corresponding antenna pair 403/404. Data is transmitted back and forth from and to the vial electronics 307 via the corresponding antenna pair 406/407.

In one possible mode of operation, the processor 511 controls (i) the vial power select module 551 via one of the select lines 512 to select one of the two power antennas 403, (ii) the vial communication select module 552 via another of the select lines 512 to select the corresponding one of the two communication antennas 407, and (iii) the vial power module 513 to provide power to the vial electronics 307 of the selected sample vial A or B via the configured vial-select module 551 and the corresponding power antenna 403. In response, the processor 511 receives raw and/or processed sensor data from the vial electronics 307 of the selected sample vial via the corresponding communication antenna 407 and the configured vial-select module 552. The processor 511 may (further) process the raw and/or processed sensor data for storage in memory 520 and/or transmission to the external end-user system 560 via the I/O module 517.

In other embodiments, other strategies can accomplish the same end result. For example, if the power is delivered to all of the vials simultaneously but read one at a time, then the vial select circuit 551 can be eliminated.

In another embodiment, energizing the sensor electronics and reading the data can be done independently of each other. A temperature measurement can be taken every time the vial is powered and stored for later retrieval on the RFID chip. This embodiment has the advantage of not requiring simultaneous power and data transmission.

Because of the extreme temperatures involved in some embodiments, −196° C. in the case of a liquid nitrogen shipper, it is advantageous to simplify the reader head electronics as much as possible. This can be done by minimizing the number of electronic components that operate in the cold, which in turn reduces the number of solder joints, etc. To this end, the reader head 550 might contain component-less antennas to read RFID tags, simple solenoids for powering the vials, etc.

In some embodiments, an RFID chip can be used to provide the data path 406/407. The vial electronics 307 can be very compact and employs both a power circuit (which may include a microprocessor for control) and an RFID communication channel to transfer data. Because the power circuit may be noisy and strong, it might not be possible use the RFID data channel and power the microprocessor simultaneously. This is because the power circuitry can jam the receiving circuitry of the RFID chip due to saturation. In embodiments where nonvolatile memory and possibly other sensors need to be active while reading, the operation of the vial circuitry is maintained when the data channel is open.

Figure 4B:
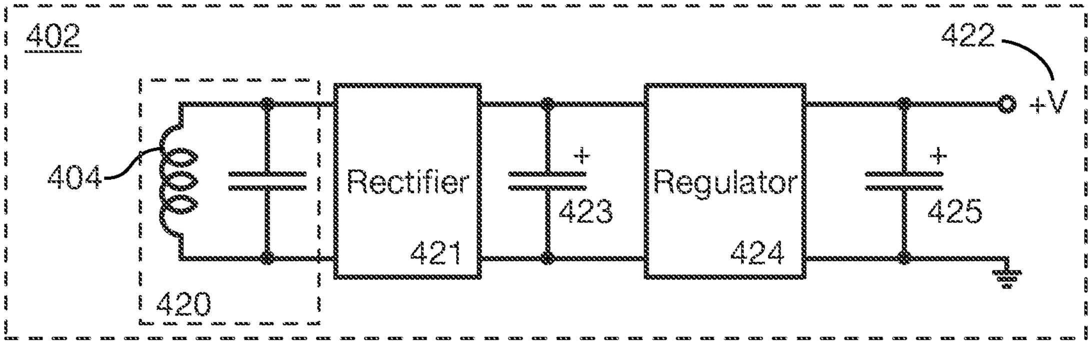
FIG. 4B is a schematic block diagram of the power module of FIG. 4A according to an embodiment.

FIG. 4B is a schematic block diagram of the power module 402 of FIG. 4A according to an embodiment that can maintain power in the vial electronics 307, even when no power is being transmitted via the power link 403/404. Power is maintained in the following way. First, power is transmitted using the antenna pair 403/404 to inject current into the LC tank circuit 420 where the inductor is the vial-side power antenna 404. Using appropriate coil ratios for the power antennas 403 and 404, a relatively large voltage can be generated in the LC tank circuit 420. This voltage is rectified using rectifier 421 which charges capacitor 423 to a voltage V that can be substantially larger than the voltage 422 that is used to operate the vial electronics 307. Once the capacitor 423 is charged, the power input to power antenna 403 is terminated. The stored charge on the input capacitor 423 is then discharged through the voltage regulator 424 and the output capacitor 425, thereby powering the vial circuitry 307. With a capacitor 423 of only a few microfarads, tens of milliseconds of operation can be supported, assuming the vial electronics 307 will draw a nominal number of milliamps and the capacitor 423 can be charged to a sufficiently high voltage. This should be enough time to accomplish the communications task without interference from the air-gapped power transmission circuitry.

Note that the data logger 500 may have its own electronics (not shown) with one or more sensors that track one or more of the same and/or different physical parameters sensed by the individual vial electronics 307. These sensors in the data logger 500 can provide information about physical parameters such as temperature outside of the cold environment, g-forces, shock, radiation, orientation, pressure, location (GPS information), insertion time, removal time, and/or light intensity. This data can, if needed, be written to the vial electronics 307 via the data path described above.

The battery 516 provides both power for operating the data logger 500 as well as power for operating the two different instances of the vial electronics 307. The clock 515 provides timestamp information for the data logger 500 and/or the different instances of the vial electronics 307. The display/UI 519 enables a user to view the status of the system including the raw and/or processed sensor data and/or control the operations of the data logger 500.

The I/O interface channel 517 can be in the form of (i) a wired connection such as, but not limited to, USB or (ii) a wireless connection such as, but not limited to, Bluetooth, WiFi, etc. In one embodiment, a cellular connection can be used for continuous updates during the shipment. This can help those responsible for the shipment to know of out-of-limit sensor data (e.g., an out-of-bounds temperature), shipment location, etc.

As with the vial electronics 307, the exact organization of how the functions of FIG. 5 are distributed amongst the components in the data logger 500 will be greatly depend on the details of how the circuitry is implemented. For example, the clock circuit 515 and the data memory 520 might be internal to the processor 511.

In another embodiment, the vial electronics 307 can contain all of the necessary sensors, store all of the measurement history, perform all of the data processing, maintain system time, contain I/O circuitry, etc. In that case, the data logger 500 will just need to supply power to the vial as needed.

Figure 6A:
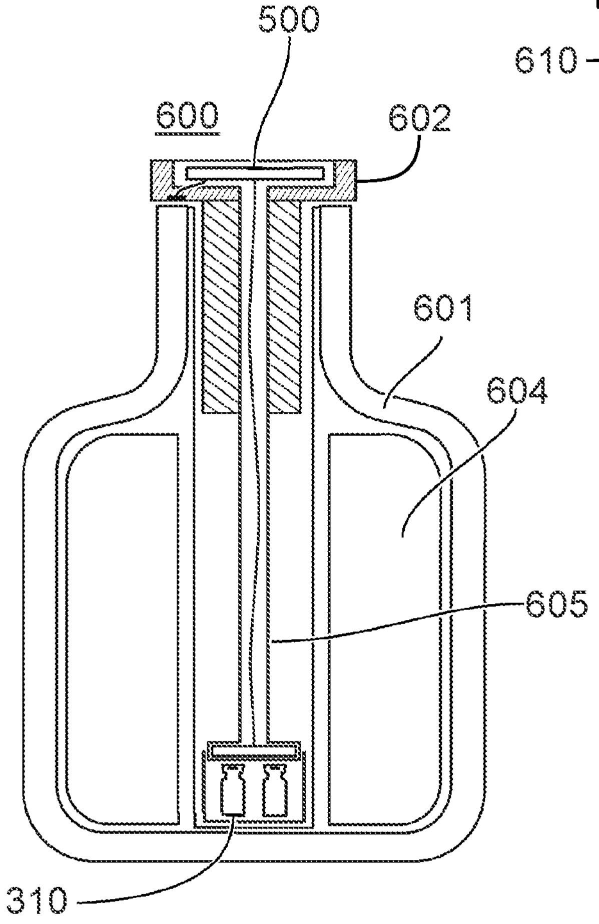
FIG. 6A is a cross-sectional side view of a dry shipper storing, in this case, two instances of the sample vial of FIG. 3A, according to certain embodiments of the disclosure.

FIG. 6A is a cross-sectional side view of a dry shipper 600 storing, in this case, two instances of the sample vial 310 of FIG. 3A having their vial electronics 307 in their vial cap, according to certain embodiments of the disclosure. Anyone skilled in the art can modify this embodiment to any suitable number of vials. Like the dry shipper 100 of FIG. 1, the dry shipper 600 has vacuum insulation 601, liquid-nitrogen absorbing material 604 defining a sample space 605, and a plug 603 connected to a cap 602. Unlike the dry shipper 100 of FIG. 1 with its solid plug 103 and solid cap 102, the plug 603 and the cap 602 of the dry shipper 600 can have corresponding openings to receive portions of an instance of the data logger 500 of FIG. 5.

In another embodiment, the same configuration can be used to monitor and track temperatures and other sensor data in environments other than a shipping container such as (without limitation) in a lab or when moving the samples from a shipping dock to a patient in a hospital.

Figure 6B:
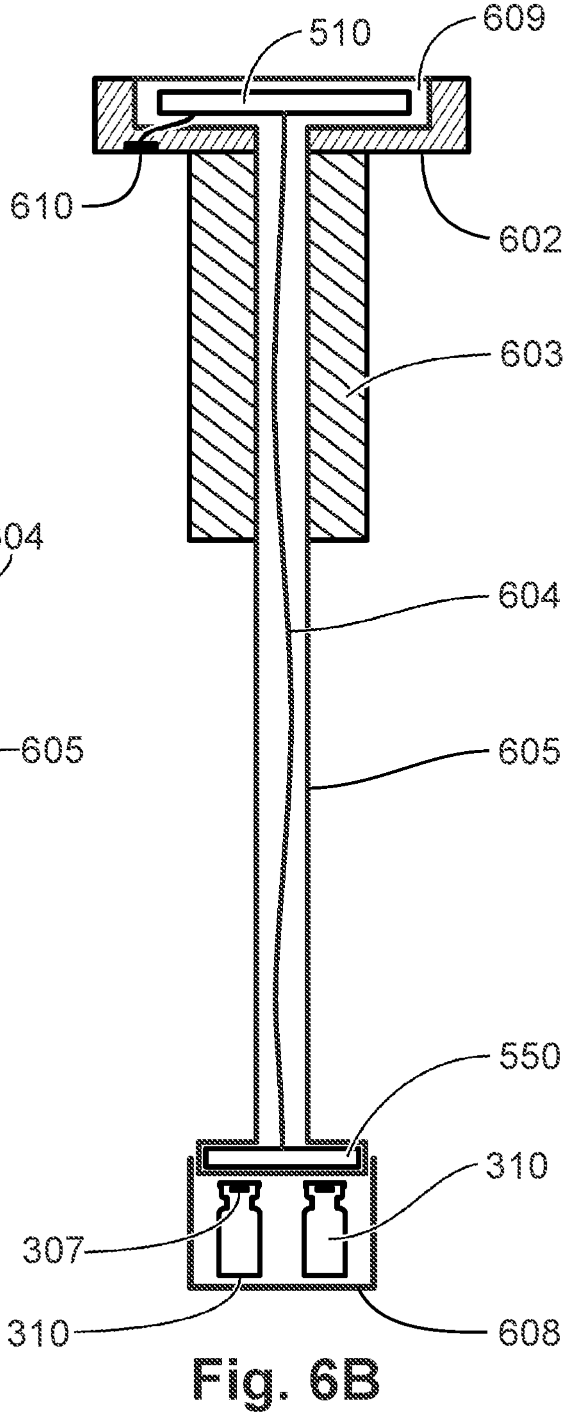
FIG. 6B is an enlarged view of the plug, the cap, the data logger, and the sample vials of FIG. 6A.

FIG. 6B is an enlarged view of the plug 603, the cap 602, the data logger 500, and the sample vials 310 of FIG. 6A. As shown in FIG. 6B, a hollow support structure 605 extends from the bottom of the hollow plug 603 down to a vial holder 608 that retains the two sample vials 310. The controller 510 of the data logger 500 is housed in a recess 609 in the cap 602, and the reader head 550 of the data logger 500 is housed at the bottom of the support structure 605 and positioned to interact with the vial electronics 307 of the sample vials 310, where the controller 510 and the reader head 550 are electronically connected by a cable 604 representing the connections 512, 521, and 522 of FIG. 5.

In addition, embedded within the cap 602 is an optional sensor 610, such as a physical switch, a photocell, or magnetic sensor, that is electronically connected to the controller 510 and configured to detect when the cap 602 is removed from the shipper 600. In one implementation, when the cap 602 is removed from the shipper 600, the plug 603, the support structure 605, the data logger 500, the vial holder 608, and the sample vials 310 are all removed with the cap 602. An advantage of this implementation is that everything needed to read and write to the vial electronics 307 is removed at once—so the removal time, temperature data, and other data can be recorded by the vial electronics 307 as they are being removed from the dry shipper 600.

In an alternative embodiment, instead of being housed within the cap 602, the controller 510 of the data logger 500 can be located on the outside of the shipper container, similar to the configuration of FIG. 1, but with the reader head 550 of the data logger 500 configured to interact directly with the different sets of vial electronics 307.

In an alternative embodiment, the vial holder 608 contains electronics similar to the vial electronics 307 that can be read by the reader head 550 independently from the vial electronics 307. In addition, one or more temperature sensors may be embedded in the vial holder 608. This has the advantage that many temperature sensors can be used above, below, and around the sample vials 310 to provide a more-complete temperature profile of the vial environment.

In an alternative embodiment, the vial holder 608 may be in the form of one or more packages with embedded electronics, and the sample vials 310 might not have electronics 307 at all. In this case, the data of interest to the end-user will be stored in the vial holder 608. This might be advantageous when, for example, a set of vials are used for a certain treatment, such that the vials can be tracked as a set with no individual vials being tracked.

Although this implementation of the data logger 500 of FIGS. 6A and 6B is designed to interact with the sample vials 310 of FIG. 3A, other suitable implementations of the data logger 500 of FIG. 5 can be designed to interact with any of the other sample vials 320-360 of FIGS. 3B-3F by properly aligning the antenna pairs 403/404 and 406/407 (or, alternatively, electrical connections).

FIG. 7A is a block diagram of a vial reader 700, according to one possible embodiment. This vial reader 700 can be used to download the data contained in the vial electronics 307 after the shipment is complete and the vial is in the hands of the end-user. Unlike the data logger 500 of FIG. 5, which can be designed to interact with multiple sample vials, the vial reader 700 is designed to interact with a single sample vial. The controller 710 of the vial reader 700 is similar to the controller 510 of the data logger 500 with analogous elements having analogous labels. The reader head 750 of the vial reader 700 is a simplified version of the reader head 550 of the data logger 500 with no vial-select switches and only a single set of antennas 703 and 707 for interacting with the antennas 404 and 406 of a single set of vial electronics 307.

Figure 7B:
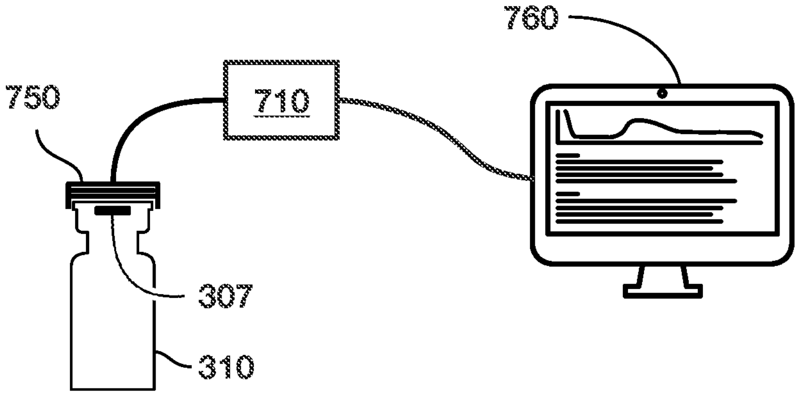
FIG. 7B contains a cross-sectional side view of a single sample vial of FIG. 3A with the reader head of the vial reader of FIG. 7A mounted onto the cap of the sample vial to read the vial electronics and connected to the controller of the vial reader of FIG. 7A.

FIG. 7B contains a cross-sectional side view of a single sample vial 310 of FIG. 3A with the reader head 750 mounted onto the cap of the sample vial 310 to read the vial electronics 307 and connected to the controller 710, which is also connected to the end-user's computer 760.

There are various ways of downloading the history of the measurements taken during the shipment depending on how the system is implemented. In one implementation, the vial electronics 307 does not record any data at all. All of the temperature and possibly other sensor data is stored in the data logger 500. In this embodiment, the user connects to the data logger 500 using the I/O channel 517. This can be a USB connection or a wireless or cellular connection, depending on the implementation of the I/O port 517. The shipment data is then downloaded by the user through this channel.

In another embodiment, all of the temperature and possibly other sensor data is stored in the vial electronics 307 only. The user can use the vial reader 700 to download the data from the vial as shown in FIG. 7B.

In yet other implementations, the data logger 500 might store some or all of the data and the vial might store some or all of the data. A complete download of the shipment data can be accomplished using the vial reader 700 and the data logger I/O channel 517.

It should be noted that a likely scenario is that all of the shipment data is recorded in the data logger 500 but some critical data (such as out-of-bounds temperature measurements) are stored in the vial electronics 307. This was described above. In this case, the end user has access to the critical data even if there is no longer access to the shipper (and logger) itself.

In embodiments where a sample holder similar to the sample holder 608 contains electronics in addition to or instead of the sample vials having the vial electronics 307, the reader head 750 is capable of interacting with the holder electronics.

In some embodiments, the components in each of the vial electronics 307, the data logger 500, and the vial reader 700 can be implemented as a single electronic chip or a small number of electronic chips.

In the systems described previously, power is transferred wirelessly to the electronics 307 using antennas. In alternative embodiments, other power-transfer techniques may be employed, such as using an optical fiber to shine light onto a photo cell that converts the light into electricity for powering the electronics 307.

Anyone skilled in the art can transfer the ideas contained in this document to a dry ice shipper (typically a foam insulated box) or any other type of shipping container used for medical samples, vaccines, cell-based therapies, blood-bags, tissues, etc.

Figure 2A:
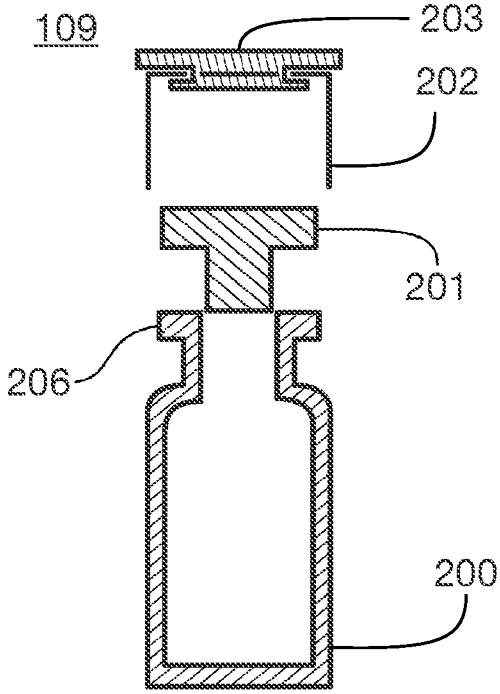
Fig. 2A (PRIOR ART)
FIGS. 2A-2C are cross-sectional side views of a conventional sample vial of FIG. 1, FIGS. 3A-3F are cross-sectional side views of respective sample vials 310-360 for storing biological material, according to certain embodiments of the disclosure.
Figure 2B:
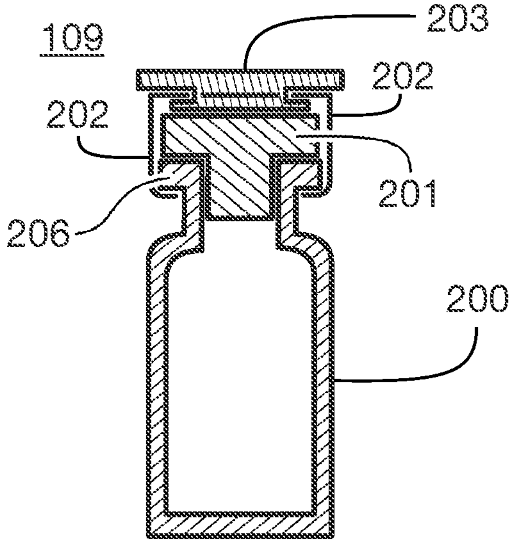
Fig. 2B (PRIOR ART)
Figure 2C:
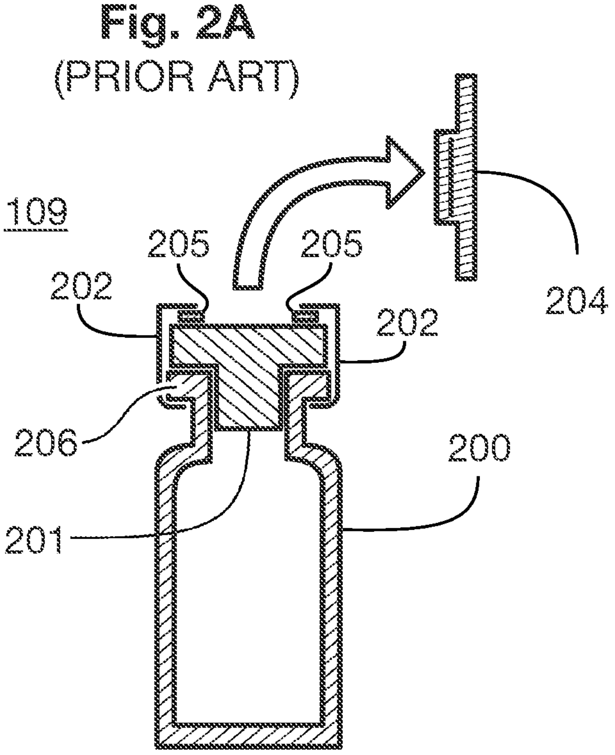
Fig. 2C (PRIOR ART)

While the type of vial shown in FIG. 2 is very common, it is not the only way samples can be shipped. For example, instead of the pop-off top shown in FIG. 2C, the container can have a simple screw cap. Anyone skilled in the art can transfer the ideas contained in this document to other types of vials, such as those with screw caps, blood-bags, tissue containers, and any other suitable type of containers. As used in the claims, the term "vial lid" refers to any element or combination of elements for closing off the top of the vial container. Thus, the plug 301, cap 303, and skirt 302 of FIG. 3A may be said to form a vial lid for the vial container 300.

As used in the claims, the term "reader device" refers to any device configured to interact with the vial electronics 307 of one or more sample vials. As such, the data logger 500 of FIG. 5 and the vial reader 700 of FIG. 7A are both examples of reader devices.

In addition to or instead of temperature, other physical parameters such as radiation, g-forces, shock, orientation, pressure, location (e.g., GPS information), insertion time, removal time, and/or light intensity might also need to be tracked to ensure the integrity of the sample.

The need to verify the cold-chain-of-custody pertains equally to other materials such as vaccines, pharmaceuticals, cell-based therapy treatments, antibodies, biologics, RNA, viable cells, etc.

In other embodiments, the vial electronics 300 communicate with the data logger 500/vial reader 700 using wired connections such as conductive contact pads and spring-loaded contacts.

In certain embodiments of the present disclosure, an article of manufacture comprises vial electronics comprising one or more sensors capable of generating sensor data corresponding to one or more physical parameters associated with a sample vial capable of storing biological material.

In at least some of the above embodiments, the vial electronics are part of a structure that is capable of being physically attached to the sample vial.

In at least some of the above embodiments, the article further comprises the sample vial, the sample vial comprising a vial container having an opening at a top of the container and an interior space capable of storing biological material and a vial lid configured to close the top of the container, wherein the vial electronics is embedded in the vial container, the vial lid, or a structure that is physically attached to the vial container or the vial lid.

In at least some of the above embodiments, the vial electronics comprises a first antenna capable of at least one of (i) transmitting the sensor data to an external communication antenna and (ii) receiving electrical power from an external power antenna for operating the vial electronics.

In at least some of the above embodiments, the first antenna is capable of transmitting the sensor data to the external communication antenna, and the vial electronics further comprises a second antenna different from the first antenna and capable of receiving the electrical power from the external power antenna.

In at least some of the above embodiments, the one or more sensors include a temperature sensor.

In at least some of the above embodiments, the temperature sensor comprises a temperature-dependent resistor and a temperature-independent resistor connected in series between two different voltage levels, wherein (i) the resistors are interconnected at a temperature-measurement node and (ii) the voltage at the temperature-measurement node is dependent on the temperature.

In at least some of the above embodiments, the vial electronics is capable of storing at least some data associated with the sensor data.

In at least some of the above embodiments, the vial electronics is capable of storing all of the data associated with the sensor data.

In at least some of the above embodiments, the vial electronics is capable of storing no data associated with the sensor data.

In at least some of the above embodiments, the article further comprises a reader device capable of interacting with the vial electronics of the sample vial, wherein the reader device comprises a controller capable of controlling operations of the reader device and a reader head capable of at least one of (i) receiving the sensor data from the vial electronics and providing the sensor data to the controller and (ii) providing electrical power to the vial electronics.

In at least some of the above embodiments, the reader head is capable of (i) receiving the sensor data from the vial electronics and providing the sensor data to the controller and (ii) providing electrical power to the vial electronics.

In at least some of the above embodiments, when the sample vial is located inside a cold space of a shipping vessel, the controller is located outside of the cold space and the reader head is located inside of the cold space in sufficiently close proximity to the sample vial to enable interaction between the reader head and the vial electronics of the sample vial.

In at least some of the above embodiments, the reader head has multiple antennas for reading sensor data from multiple sets of the vial electronics associated with multiple sample vials.

In at least some of the above embodiments, the sample vial has a unique ID value and the reader head is capable of reading the unique ID value of the sample vial.

In at least some of the above embodiments, the reader device is capable of storing at least some data associated with the sensor data.

In at least some of the above embodiments, the reader device is capable of storing all of the data associated with the sensor data.

In at least some of the above embodiments, the vial electronics is capable of storing no data associated with the sensor data.

In at least some of the above embodiments, the article further comprises a shipping vessel comprising a vessel container defining a sample space for receiving the sample vial, a vessel plug capable of being inserted into an opening at a top of the vessel container, and a vessel cap physically connected to the vessel plug, wherein the vessel plug has a hollow interior that houses a cable interconnecting the controller and the reader head.

In at least some of the above embodiments, the controller is housed within a recess in the vessel cap and the reader head is housed within a support structure extending from the bottom of the vessel plug to a location in sufficiently close proximity to the sample vial to enable interaction between the reader head and the vial electronics of the sample vial.

In at least some of the above embodiments, the vessel cap has electronics capable of detecting removal of the vessel cap from the shipping vessel.

In certain embodiments of the present disclosure, an article of manufacture comprises a reader device capable of interacting with the vial electronics of the sample vial of claim I, wherein the reader device comprises a controller capable of controlling operations of the reader device and a reader head capable of at least one of (i) receiving the sensor data from the vial electronics and providing the sensor data to the controller and (ii) providing electrical power to the vial electronics.

In at least some of the above embodiments, the reader head is capable of (i) receiving the sensor data from the vial electronics and providing the sensor data to the controller and (ii) providing electrical power to the vial electronics.

In at least some of the above embodiments, when the sample vial is located inside a cold space of a shipping vessel, the controller is located outside of the cold space and the reader head is located inside of the cold space in sufficiently close proximity to the sample vial to enable interaction between the reader head and the vial electronics of the sample vial.

In at least some of the above embodiments, the reader head has multiple antennas for reading sensor data from multiple sets of the vial electronics associated with multiple sample vials.

In at least some of the above embodiments, the sample vial has a unique ID value and the reader head is capable of reading the unique ID value of the sample vial.

In at least some of the above embodiments, the reader device is capable of storing at least some data associated with the sensor data.

In at least some of the above embodiments, the reader device is capable of storing all of the data associated with the sensor data.

In at least some of the above embodiments, the vial electronics is capable of storing no data associated with the sensor data.

In at least some of the above embodiments, the article further comprises a shipping vessel comprising a vessel container defining a sample space for receiving the sample vial, a vessel plug capable of being inserted into an opening at a top of the vessel container, and a vessel cap physically connected to the vessel plug, wherein the vessel plug has a hollow interior that houses a cable interconnecting the controller and the reader head.

In at least some of the above embodiments, the controller is housed within a recess in the vessel cap and the reader head is housed within a support structure extending from the bottom of the vessel plug to a location in sufficiently close proximity to the sample vial to enable interaction between the reader head and the vial electronics of the sample vial.

In at least some of the above embodiments, the vessel cap has electronics capable of detecting removal of the vessel cap from the shipping vessel.

Embodiments of the disclosure may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, micro-code, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Although the abbreviation "RF" stands for radio frequency, as used in this specification, the term "RF" covers any suitable frequency of electromagnetic radiation for communication.

Digital information can be transmitted over virtually any channel. Transmission applications or media include, but are not limited to, coaxial cable, twisted pair conductors, optical fiber, radio frequency channels, wired or wireless local area networks, digital subscriber line technologies, wireless cellular, Ethernet over any medium such as copper or optical fiber, cable channels such as cable television, and Earth-satellite communications.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware)

for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. An article of manufacture comprising electronics comprising:

memory capable of receiving and storing externally generated sensor data corresponding to one or more physical parameters associated with a sample container capable of storing biological material, wherein the electronics are part of a structure that is capable of being physically attached to the sample container such that the externally generated sensor data stored in the memory of the electronics is capable of being subsequently read from the electronics, wherein the externally generated sensor data is generated by one or more sensors located outside of the sample container;

a power module;

a communication module; and a processor operable to control data write and read operations of the electronics, wherein:

during a data write operation:

the power module receives electrical power wirelessly from an external power source to power the electronics;

the communication module receives incoming, externally generated sensor data wirelessly from an external communication system; and the processor (i) receives the incoming, externally generated sensor data from the communication module and (ii) stores the incoming, externally generated sensor data to the memory; and during a subsequent data read operation:

the power module receives electrical power wirelessly from a same or different external power source to power the electronics;

the processor (i) reads outgoing, externally generated sensor data from the memory and (ii) provides the outgoing, externally generated sensor data to the communication module; and the communication module transmits the outgoing, externally generated sensor data wirelessly to a same or different external communication system.

2. The article of claim 1, further comprising the sample container, the sample container being a sample vial comprising:

a vial container having an opening at a top of the vial container and an interior space capable of storing biological material; and a vial lid configured to close the top of the vial container, wherein the electronics is embedded in the vial container, the vial lid, or a structure that is physically attached to the vial container or the vial lid.

3. The article of claim 1, wherein the electronics comprises a first antenna capable of at least one of (i) receiving and/or transmitting the externally generated sensor data from and/or to an external communication antenna and (ii) receiving the electrical power from an external power antenna for operating the electronics.

4. The article of claim 3, wherein:

the first antenna is capable of receiving and/or transmitting the externally generated sensor data from and/or to the external communication antenna; and the electronics further comprises a second antenna different from the first antenna and capable of receiving the electrical power from the external power antenna.

5. The article of claim 1, wherein the electronics further comprises a temperature sensor.

6. The article of claim 5, wherein the temperature sensor comprises a temperature-dependent resistor and a temperature-independent resistor connected in series between two different voltage levels, wherein (i) the resistors are interconnected at a temperature-measurement node and (ii) the voltage at the temperature-measurement node is dependent on the temperature.

7. The article of claim 1, further comprising a reader device capable of interacting with the electronics of the sample container, wherein the reader device comprises:

a controller capable of controlling operations of the reader device; and a reader head capable of at least one of (i) transmitting and/or receiving the externally generated sensor data to and/or from the electronics wirelessly and providing the externally generated sensor data to the controller and (ii) providing electrical power to the electronics wirelessly.

8. The article of claim 7, wherein the reader head is capable of (i) transmitting and/or receiving the externally generated sensor data to and/or from the electronics wirelessly and providing the externally generated sensor data to the controller and (ii) providing electrical power to the electronics wirelessly.

9. The article of claim 7, wherein, when the sample container is located inside a cold space of a shipping vessel, the controller is located outside of the cold space and the reader head is located inside of the cold space in sufficiently close proximity to the sample container to enable interaction between the reader head and the electronics of the sample container.

10. The article of claim 7, wherein the reader head has multiple antennas for reading externally generated sensor data wirelessly from multiple sets of the electronics associated with multiple sample containers.

11. The article of claim 7, wherein the sample container has a unique ID value and the reader head is capable of reading the unique ID value of the sample-container.

12. The article of claim 7, wherein the reader device is capable of storing at least some data associated with the externally generated sensor data.

13. The article of claim 12, wherein the reader device is capable of storing all of the data associated with the externally generated sensor data.

14. The article of claim 7, further comprising a shipping vessel comprising a vessel container defining a sample space for receiving the sample container, a vessel plug capable of being inserted into an opening at a top of the vessel container, and a vessel cap physically connected to the vessel plug, wherein the vessel plug has a hollow interior that houses a cable interconnecting the controller and the reader head.

15. The article of claim 14, wherein the controller is housed within a recess in the vessel cap and the reader head is housed within a support structure extending from the bottom of the vessel plug to a location in sufficiently close proximity to the sample container to enable interaction between the reader head and the electronics of the sample-container.

16. The article of claim 14, wherein the vessel cap has cap electronics capable of detecting removal of the vessel cap from the shipping vessel.

17. An article of manufacture comprising a reader device capable of interacting wirelessly with the electronics of the sample container of claim 1, wherein the reader device comprises:

a controller capable of controlling operations of the reader device; and a reader head capable of writing the externally generated sensor data to be stored in the memory of the electronics and at least one of (i) receiving the externally generated sensor data from the electronics wirelessly and providing the externally generated sensor data to the controller and (ii) providing electrical power to the electronics wirelessly.

18. The article of claim 17, wherein the reader head is capable of (i) receiving the externally generated sensor data from the electronics wirelessly and providing the externally generated sensor data to the controller and (ii) providing electrical power to the electronics wirelessly.

19. The article of claim 17, wherein, when the sample container is located inside a cold space of a shipping vessel, the controller is located outside of the cold space and the reader head is located inside of the cold space in sufficiently close proximity to the sample container to enable interaction between the reader head and the electronics of the sample container.

20. The article of claim 17, wherein the reader head has multiple antennas for reading externally generated sensor data wirelessly from multiple sets of the electronics associated with multiple sample containers.

21. The article of claim 17, wherein the sample container has a unique ID value and the reader head is capable of reading the unique ID value of the sample-container.

22. The article of claim 17, wherein the reader device is capable of storing at least some data associated with the externally generated sensor data.

23. The article of claim 22, wherein the reader device is capable of storing all of the data associated with the externally generated sensor data.

24. The article of claim 17, further comprising a shipping vessel comprising a vessel container defining a sample space for receiving the sample container, a vessel plug capable of being inserted into an opening at a top of the vessel container, and a vessel cap physically connected to the vessel plug, wherein the vessel plug has a hollow interior that houses a cable interconnecting the controller and the reader head.

25. The article of claim 24, wherein the controller is housed within a recess in the vessel cap and the reader head is housed within a support structure extending from the bottom of the vessel plug to a location in sufficiently close proximity to the sample container to enable interaction between the reader head and the electronics of the sample-container.

26. The article of claim 24, wherein the vessel cap has cap electronics capable of detecting removal of the vessel cap from the shipping vessel.

27. The article of claim 17, wherein the reader device is capable of storing in the memory of the electronics multiple sets of externally generated sensor data over time to record in the memory of the electronics a history of the one or more physical parameters associated with the sample container.

28. An article of manufacture comprising a reader device capable of interacting with the electronics of the sample container of claim 1 wirelessly, wherein the reader device comprises:

a controller capable of controlling operations of the reader device;

a reader head capable of at least one of (i) transmitting and/or receiving the externally generated sensor data to and/or from the electronics wirelessly and providing the externally generated sensor data to the controller and (ii) providing electrical power to the electronics wirelessly; and a shipping vessel comprising a vessel container defining a sample space for receiving the sample container, a vessel plug capable of being inserted into an opening at a top of the vessel container, and a vessel cap physically connected to the vessel plug, wherein the vessel plug has a hollow interior that houses a cable interconnecting the controller and the reader head, wherein the controller is housed within a recess in the vessel cap and the reader head is housed within a support structure extending from the bottom of the vessel plug to a location in sufficiently close proximity to the sample container to enable interaction between the reader head and the electronics of the sample container.

29. The article of claim 28, wherein the vessel cap has cap electronics capable of detecting removal of the vessel cap from the shipping vessel.

30. The article of claim 1, wherein the memory of the electronics is capable of storing multiple sets of externally generated sensor data over time to record in the memory of the electronics a history of the one or more physical parameters associated with the sample container.

31. An article of manufacture comprising:

electronics capable of storing and retrieving externally generated sensor data corresponding to one or more physical parameters associated with a sample container capable of storing biological material;

a reader device capable of interacting with the electronics of the sample container wirelessly, wherein the reader device comprises:

a controller capable of controlling operations of the reader device; and a reader head capable of at least one of (i) transmitting and/or receiving the externally generated sensor data to and/or from the electronics wirelessly and providing the externally generated sensor data to the controller and (ii) providing electrical power to the electronics wirelessly, wherein the externally generated sensor data is generated by one or more sensors located outside of the sample container; and a shipping vessel comprising a vessel container defining a sample space for receiving the sample container, a vessel plug capable of being inserted into an opening at a top of the vessel container, and a vessel cap physically connected to the vessel plug, wherein the vessel plug has a hollow interior that houses a cable interconnecting the controller and the reader head, wherein the controller is housed within a recess in the vessel cap and the reader head is housed within a support structure extending from the bottom of the vessel plug to a location in sufficiently close proximity to the sample container to enable interaction between the reader head and the electronics of the sample container.

32. The article of claim 31, wherein the vessel cap has cap electronics capable of detecting removal of the vessel cap from the shipping vessel.

* * * * *